March 8, 1949. W. L. MORGAN 2,463,791
METHOD OF COATING WITH QUARTZ
BY THERMAL EVAPORATION
Filed Nov. 15, 1946 2 Sheets-Sheet 1

INVENTOR.
Willard L. Morgan.
BY
ATTORNEYS

March 8, 1949.
W. L. MORGAN
METHOD OF COATING WITH QUARTZ
BY THERMAL EVAPORATION
Filed Nov. 15, 1946
2,463,791
2 Sheets-Sheet 2
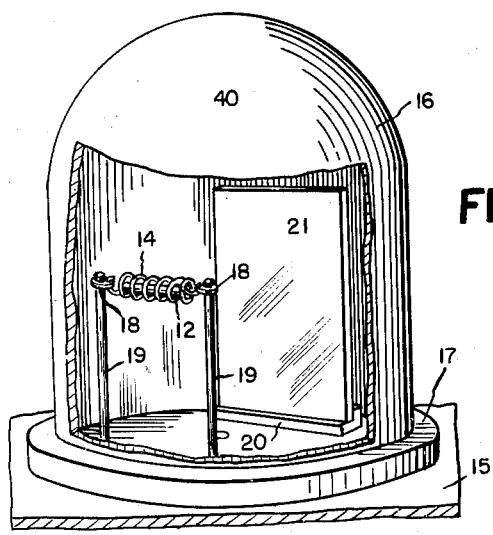
FIG.10.
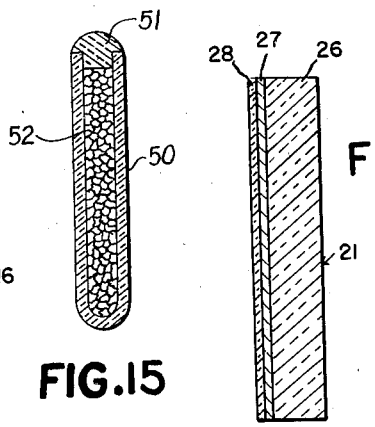
FIG.11.
FIG.15
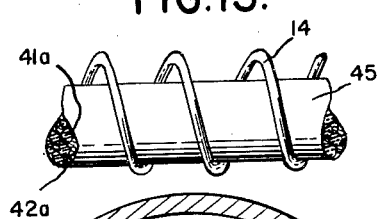
FIG.13.
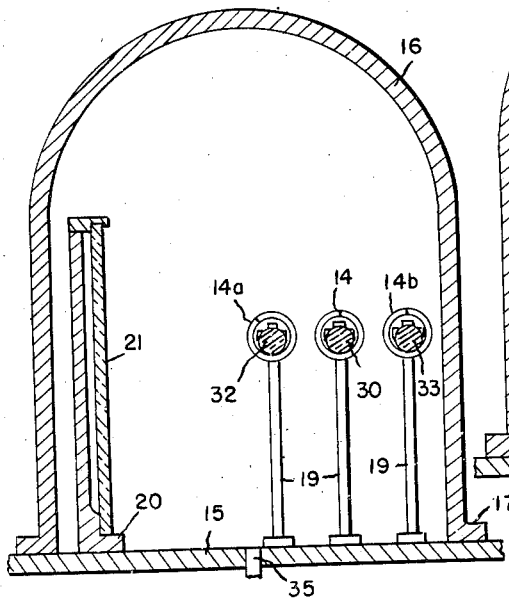
FIG.12.
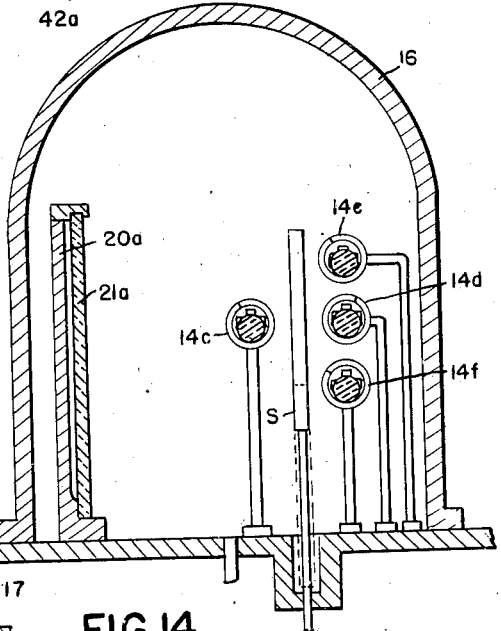
FIG.14.
*INVENTOR.*
WILLARD L. MORGAN
BY
ATTORNEYS Patented Mar. 8, 1949

2,463,791

UNITED STATES PATENT OFFICE 2,463,791

METHOD OF COATING WITH QUARTZ BY THERMAL EVAPORATION

Willard L. Morgan, Haverford, Pa., assignor to Libbey-Owens-Ford Glass Company, Toledo, Ohio, a corporation of Ohio Application November 15, 1946, Serial No. 709,932

11 Claims. (Cl. 117—106)

The present invention relates to a method of coating with quartz by thermal evaporation in a manner to improve the evaporation of the quartz so as to secure a rapid and easy evaporation of the same, which may be controlled, and in a manner to provide for uniform thermal evaporation of the quartz and uniform and heavy coatings of the quartz upon articles of manufacture such, for example, as glass, plastic, reflectors, mirrors, articles coated for low reflection, or other articles of manufacture. The invention may be employed in the production of coatings in which the quartz layer functions in producing low reflection effects.

Quartz is highly transparent and because of this and its known characteristic of extreme hardness, it provides a particularly desirable and satisfactory permanent coating or covering for the face or surface of a mirror or reflector, especially a first surface mirror or an article of low reflection, and such a coating prevents any danger of scratching or otherwise marring such face or surface.

Attempts to thermally evaporate quartz directly by the method of thermal evaporation and to apply it by deposition to surfaces, such as reflective surfaces, have not been satisfactory for the reason that quartz is extremely difficult to heat and to evaporate. Quartz must be heated beyond 1500° C. to bring about vaporization and preferably quartz must be heated to a range of 1800° to 2000° C. or more. It is known that quartz does not absorb heat by radiation and does not melt during evaporation. As a solid it does not adhere to or wet a thermal heating element, or filament or other heating surface and the thermal contact with such element, filament or surface is very poor. Thus, getting heat into quartz becomes a problem and as its temperature must be raised very greatly to secure evaporation it has been found that quartz does not lend itself to evaporation by normal thermal evaporation technique. Where attempts have been made to thermally evaporate ordinary quartz within a vacuum and to deposit this upon a surface as a coating, the operations have been found to be very uncertain and at best only small quantities of quartz could be evaporated. Further, the process of deposition was slow and unsatisfactory and uniform coatings were not obtained.

I have discovered that if some solid metallic oxide of a heat stable nature is intermingled with the quartz or applied as a surface coating for the quartz, the thermal evaporation of the quartz is materially enhanced in that it becomes more uniform and more rapid and, moreover, that the coating of a support surface, such as glass, plastic, or a reflective surface, by deposition thereupon of evaporated quartz, could be satisfactorily controlled to produce a uniform protective coating or a desired low reflection coating. The desired improved effects are also found when the quartz to be evaporated is heated as a mixture with or in the presence of a solid metallic oxide of a stable nature such as aluminum oxide, calcium oxide, iron oxide, etc., the quartz readily evaporating from such mixtures when heated in a vacuum.

It is, therefore, one of the objects of the invention to provide an improved method or process whereby the thermal evaporation of quartz and its application, by deposition, as a coating or covering for a surface can be achieved.

Another object of the invention is to provide an improved method or process whereby the evaporation of quartz can be controlled and speeded up to produce, by deposition, a uniform and relatively thick and extremely hard protective surface coating on the face or surface of an article, such as, for example, glass or plastic or the reflective or mirrored surface of a piece of glass.

Another object of the invention is to provide improved means or method whereby the quartz may be preliminarily treated, or mixed with the desired oxide in a relatively simple and inexpensive manner to prepare the quartz for relatively rapid evaporation and dispersion when it is applied to a heat radiating support body within a vacuum such as an electrical thermal evaporation element and more particularly a tungsten or other filament or an electrically heated crucible.

In accordance with one method of carrying out the invention, the quartz to be evaporated and deposited upon a surface is first coated or covered with a stable solid metallic oxide. This may be carried out by thermally evaporating any one of such metallic oxides to form a thin film upon the quartz by exposing the quartz to the vapors of the metallic oxide within a vacuum chamber in which the metallic oxide, such as for example aluminum oxide or iron oxide, is evaporated. Other methods of precoating the quartz with such metallic oxides can be employed, such as first coating the quartz with a sprayed or thermally evaporated metal and thereafter converting the metal to metallic oxide by any suitable method, such as heating the metal coated quartz in air or anodizing. Aluminum may thus be coated upon quartz by spraying the molten metal and this may be thereafter converted to aluminum oxide upon the surface of the quartz and many other metals may be similarly applied and oxidized to produce oxide materials upon the quartz surfaces. Still other ways of precoating or precovering or of intimately mixing the quartz with metallic oxides such as aluminum oxide, magnesium oxide, cobalt oxide, copper oxide, for example, may be utilized, such as by chemically forming the desired metallic oxide thereon or merely by subjecting the quartz either as powder or pieces to a tumbling action in the presence of powdered solid metallic oxides.

The dusty coating of metallic oxide thus applied to the quartz may afterwards be fused or sintered if desired by a preliminary heat treatment. The quartz and metallic oxide, such as aluminum oxide or titanium oxide for example, may after being mechanically intimately mixed together be fused and other methods of intimately placing one of the metallic oxides in the presence of the quartz have been found to be operative in giving the rapid and controlled evaporation of the quartz when the mixture is subsequently heated in a vacuum. In using a metallic oxide which is readily volatile we have found that such oxides when applied to the quartz as coatings may evaporate before the quartz becomes sufficiently heated. Such oxides, for example, zinc oxide, chromium oxide, or the blue tungsten oxide, have been found to accelerate the evaporation of quartz when these oxides are actually present at the evaporation temperatures of the quartz and for the purpose of having these oxides present at the evaporation temperatures it has been found desirable that these oxides be intimately commingled with the quartz.

The coating or mixing of the quartz with the desired solid metallic oxide may also be accomplished by chemically forming the oxide upon the quartz. Thus a metallic compound which when heated will decompose to an oxide may be chemically mixed with or applied to the quartz and the treated quartz then heated to form the desired oxide, the heating being carried out either prior to the thermal evaporation or at the time of the thermal evaporation in the vacuum when such compound will decompose before the evaporation temperatures of the quartz are attained. Thus for example aluminum hydroxide or other metallic hydroxides such as calcium hydroxide or copper hydroxide may be mixed with or precipitated upon the surfaces of the quartz and upon heating the treated quartz, aluminum oxide or the other desired metallic oxide will be formed upon the heated quartz by the decomposition of such hydroxide. In a similar manner the quartz may be treated with solutions of the nitrates, acetates, formates or other simple organic or inorganic salts of the metals or mixed with such salts directly and upon heating these salts with the quartz the desired metallic oxide is secured with the quartz. In such manner, I may apply aluminum acetate or calcium nitrate for example to permit by heat decomposition the forming upon the quartz of aluminum oxide or of calcium oxide. Likewise readily decomposible carbonates of metals such as calcium, barium, or iron carbonates for example may be formed upon the surface of the quartz or mixed with the quartz and upon heating the treated quartz a metallic oxide such as for example calcium oxide, barium oxide, or iron oxide respectively be formed on or mixed with the quartz. Salts such as ammonium vanadate or ammonium tungstate may be mixed with the quartz and heated to give a mixture of vanadium oxide or tungsten oxide with the quartz.

It will be apparent that the solid metallic oxide employed must be sufficiently heat stable to avoid being completely decomposed before the quartz becomes sufficiently heated to be in the evaporation range of temperatures. Thus the readily decomposible metallic oxides of mercury, gold, silver, and platinum, will not operate to give the desired improved evaporation of quartz since it is impossible to have these oxides present at the evaporation temperatures of the quartz.

I have found that I may employ for the purposes of securing the accelerated and controlled uniform evaporation of quartz described in this invention any solid metallic oxide, such that it is stable or alterable to another stable metallic oxide at the temperature of the evaporation of the quartz in the vacuum and may use for example, the oxides of aluminum, thorium, beryllium, magnesium, calcium, strontium, barium, titanium, zirconium, lithium, vanadium, chromium, molybdenum, tantalum, tungsten, sodium, potassium, uranium, iron, manganese, cobalt, nickel, chromium, copper, lead, tin, bismuth, cerium, and zinc. As certain higher oxides such as barium peroxide, chromium trioxide, and cupric oxide are readily altered with loss of oxygen upon heating to lower oxides which are heat stable it is found that the use of such higher oxides gives the desired improved evaporation of quartz just the same as if the lower stable oxides were directly applied or mixed with the quartz in the first place. The various higher and lower oxides of the metals such as those above given may thus be employed and I may for example use ferric oxide or ferrous oxide, aluminum trioxide, or aluminum monoxide, titanium dioxide or titanium trioxide or titanium monoxide, magnesium oxide, calcium oxide, zinc oxide, cupric oxide, cuprous oxide, tin oxide, lead monoxide, vanadium trioxide, tungsten trioxide, and cobaltous oxide.

The quartz treated or mixed with oxide in the manner above described is according to the method of this invention then placed in a suitable manner in a vacuum on a heat radiating support body such as an electrically heated coil or an electrically heated receptacle. In the present instance, the coil is a tungsten filament and the receptacle is a crucible. Such support body is then heated to heat the quartz. A superficial molten condition generally appears on the surface of the heat treated quartz which permits securing good heat contact by the quartz with the heat radiating support body such as the filament or crucible. The treated quartz due to the metallic oxide mixed therewith, in contrast to ordinary quartz alone, readily absorbs radiant heat, and both this condition and the good thermal contact secured by the slight fusion, permit the rapid influx of heat into the quartz and the raising of its temperature to a point where evaporation can be secured. The temperature of the heat radiating support body is maintained at a high degree and the heat penetrates the entire body of the treated quartz so that its evaporation proceeds positively and regularly, thus permitting by reason of uniform thermal evaporation from all surfaces of the quartz, the securing of uniform and controlled surface coatings of quartz by the deposition of the evaporated quartz upon the surface of an article of manufacture, such for example as a mirror.

While it is preferred to preliminarily coat the quartz with the metallic oxide since only very small amounts of such a metallic oxide as for example aluminum oxide need thus be used to secure rapid uniform heating and evaporation of the quartz, it has also been found that the coating of the quartz with the metallic oxide may be accomplished directly if the quartz is heated in the presence of the metallic oxide when the latter will melt at a temperature below that at which the quartz is evaporated, since the oxide on melting, runs over the surfaces of the quartz and thus places the quartz in condition for subsequent evaporation. Thus, for example, as one means of satisfactorily accomplishing the evaporation of quartz it has been found that mixed pieces of quartz and aluminum oxide which latter melts at 2050° C. may be directly placed within a heat radiating support body, such as a filament or crucible, and heated and upon fusion of the aluminum oxide and the continuation of the heating, the quartz is found to vaporize rapidly, leaving the aluminum oxide behind as a residue. Such support body coated with the aluminum oxide or other residual oxide coating may in turn be employed to secure further evaporation of untreated quartz if, after quartz is placed in such coated filament, it is heated in a vacuum to first fuse the metallic oxide such as aluminum oxide and then to cause the same to spread out over the quartz and cause it to take up the heat from the filament directly by conduction through the liquid coating and by absorption of radiant heat. The quartz thus coated readily evaporates upon further heating. While quantities of metallic oxides in excess of 10% may be employed to secure the desired improved evaporation of quartz, a quantity less than 5% and generally under 1% is sufficient.

In general then, the process or method comprises positioning quartz, precoated with, mixed with, in intimate contact with or in the presence of a stable solid metallic oxide or metallic compound giving such an oxide on heating adjacent to and preferably on and in thermal contact with a heat radiating support body such as an electrically heated filament, receptacle or crucible within a high vacuum and heating the quartz and metallic oxide to a high temperature by conduction and/or heat radiation from such support body and continuing the heating to evaporate the quartz and deposit the quartz upon a surface of a support, mirror, or other article.

The foregoing and other objects and advantages of the invention will appear from the following description and appended claims when considered in connection with the accompanying drawings forming a part of this specification wherein like reference characters designate corresponding parts in the several views.

In said drawings:

Figure 10 is a perspective view, partly broken away, of a suitable apparatus for performing the technique of evaporation of the metallic oxide precoated or covered quartz, or of the quartz in the presence of a metallic oxide in accordance with the invention, and for effecting the quartz deposition upon the surface of an article.

Figure 11 is a sectional view of a mirror or reflector having a surface protective coating or layer of quartz produced in accordance with the present method or process.

Figure 12 is a vertical sectional view of an apparatus similar to that shown in Figure 10, wherein a plurality of electrically heated resistance coils or filaments are provided.

Figure 13 is a view similar to Figure 4 showing a round bar or rod of commingled or intimately mixed metallic oxide and quartz similarly supported by an electric coil or filament, and Figure 14 is a view similar to Figure 12 showing a modified construction of apparatus.

Figure 15 is a longitudinal section through a closed quartz tube containing a radiant heat absorbing material.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
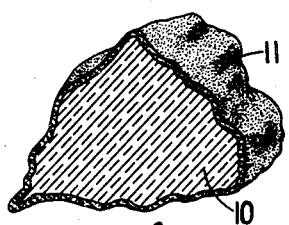
Figure 1 is a fragmentary perspective view, partly in section, showing a piece of metallic oxide precoated or covered quartz of irregular contour, in accordance with the invention.

Referring now particularly to Figure 1 of the drawings, there is shown a lump or piece of quartz 10 of irregular contour or formation upon the surface of which there is provided a coating or covering 11 consisting of a metallic oxide, such as aluminum oxide.

Figure 2:
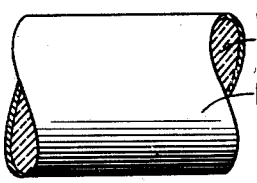
Figure 2 is an elevational view, partly in section, showing a precoated round bar, rod, or stick of quartz in accordance with the invention.
Figure 3:
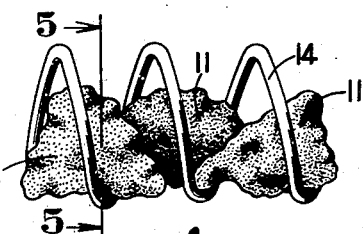
Figure 3 is an elevational view of a portion of an electric coil or filament shown supporting several irregular pieces of oxide precoated or covered quartz, to which, when the filament is heated, it may radiate and supply heat, in accordance with the invention.

In Figure 2 there is shown a similarly coated round bar, or stick 12 of quartz in which the surface coating or covering, is shown at 13. It is to be understood that the coating or covering 11 or 13 may be applied to the surface of the quartz in any suitable manner, such as by thermal evaporation, chemical formation thereupon, fusion upon the quartz of the oxide, or by coating with powdered material. Where it is desired to carry out the coating or covering in the latter manner one satisfactory method is to place the quartz bars, rods, sticks or pieces along with finely powdered metallic oxide in a conventional tumbling or mixing apparatus or device (not shown) which is subjected to agitation to cause the metallic oxide to cover substantially all of the surfaces of the quartz. The tumbling device may be of any suitable and well known construction and, because of its conventional nature, it has not ben deemed necessary to illustrate any such device or apparatus in the drawings accompanying this specification.

In Figure 12 there is shown a suitable apparatus for applying metallic oxide coatings to quartz by thermal evaporation within a vacuum. The apparatus, as shown, comprises a supporting base 15 upon which is mounted a housing or bell-like casing 16 having at its lower end a surrounding outward projection or flange 17 which rests upon the supporting base, the housing and base together providing a closed and sealed chamber. The base 15 supports three electric coil or filament assemblies having coils 14a, 14 and 14b which, as shown, are of the type shown in Figures 3 to 6, inclusive. They are located within the housing 16 and supported therein in substantially horizontal position with their opposite ends attached to suitable supporting members or brackets 18, as more particularly apparent in Figure 10. The coils or filaments, as shown, are adjustably mounted upon upright posts or rods 19 carried by the base 15 and the coils or filaments may be made from some suitable refractory material such, for example, as tungsten, tantalum or molybdenum. These filaments may be heated by passing an electric current therethrough in more or less conventional manner.

In order to coat quartz with a metallic oxide such for example as aluminum oxide by thermal evaporation, pieces 30 of ordinary quartz are placed in one of the coils or convolutions of the filament 14 and supported thereby and pieces of the metallic oxide 32 such as aluminum oxide are placed in an adjacent filament 14a, the filaments forming part of the apparatus shown in Figure 12. The chamber of the apparatus is then evacuated and a high vacuum of the order of 10 to the minus 5 millimeters created therein by means of suitable pumps (not shown) attached to the chamber through the pipe 35. The electric coil or filament 14a of tungsten, for example, which carries the aluminum oxide or other metallic oxide, is now energized and thus heated, whereby the aluminum or other metallic oxide is vaporized, with a part thereof depositing upon the quartz 30. Preferably, the quartz is also coated on the other side (toward the right in Figure 12) by a similar evaporation of the metallic oxide 33 such as aluminum oxide from the third and similar filament 14b located adjacent such other side, as shown. The coated quartz may then be evaporated directly by energizing the supporting filament which is also coated with the metallic oxide or aluminum oxide, or, if desired, the coated quartz may be removed and evaporated in a different chamber, using uncoated filaments.

In a somewhat different way the apparatus shown in Figure 12 may be employed in the forming of a metallic oxide coating such as an aluminum oxide coating upon quartz so as to prepare it for ready thermal evaporation. After the pieces of quartz 30 are placed in the filament 14, there is placed in an adjacent filament, such as filament 14b for example, some metal pieces (not shown) such as aluminum pieces and after evacuating the chamber, the filament 14b, or similar filament, is heated to vaporize the metal or aluminum and to cause a relatively light deposit of the metal or aluminum to be formed on the quartz 30. The metal, and more particularly aluminum coated quartz pieces thus produced, on which the coating of metal may be of a thickness such as 0.1 to 0.01 micron or thousandths of a millimeter, or thinner, may then be subjected to a further step either within the vacuum chamber or after removal from the same, to oxidize the metal or aluminum coating completely to a metallic, and more particularly, aluminum oxide coating. Such oxide coatings are very thin and are less than 1% of the weight of the quartz pieces. For example, by treating metal coated quartz pieces to a hot flame, or by heating at a temperature of 300° C. or more in an oxygen containing atmosphere, the metal or aluminum coating is changed into a metallic, or aluminum oxide coating, upon the quartz pieces.

Figure 4:
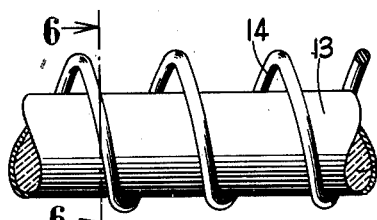
Figure 4 is a view similar to Figure 3 showing a round bar or rod of oxide precoated quartz similarly supported by an electric coil or filament.

It is not necessary that the entire surface area of the quartz be covered by a metallic oxide 13 such as aluminum oxide as seen in Figures 2 and 4, the coating resulting from either of the two thermal evaporations methods and means of forming such coatings upon quartz just described above. If desired, the particles of the coating or covering of oxide may be slightly spaced apart on the surfaces of the quartz, as shown at 11 in Figures 1 and 3. Coatings or coverings of this type result from the action of tumbling the oxide powder with the quartz pieces mentioned above; or the desired coatings or coverings may be produced by chemical formation of the metallic oxide upon the quartz pieces. Thus the quartz pieces may be treated to an aluminum acetate solution or to an aluminum hydroxide suspension and thereafter the drained pieces may be heated to destroy the acetate and hydroxide and convert these into aluminum oxide which remains as a coating of discontinuous nature upon the quartz. The heating and decomposition of the metallic acetate, or metallic hydroxide treated quartz pieces to secure a metallic oxide coating thereon may also be carrid out by heating the quartz in the vacuum chamber, as the quartz is warmed up prior to being thermally evaporated.

Figure 9:
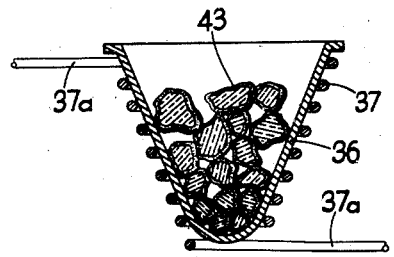
Figure 9 is a sectional view of an electric heating coil and crucible in accordance with the present invention, the crucible, as shown, containing pieces or particles of metallic oxide precoated quartz.
Figure 9A:
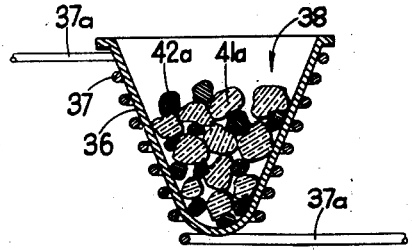
Figure 9a is a view similar to Figure 9, in which the crucible is shown as containing an intimate mixture of pieces or particles of uncoated quartz and pieces of another material comprising a metallic oxide, such as aluminum oxide.

After having been coated or covered with the oxide the quartz pieces of irregular shape 10, or of round bar or rod shape 12 are, as illustrated in Figures 3 to 6, inclusive, placed within the coil of an electric filament, such as the filament 14, or within a refractory thoria or other crucible 36, such as shown in Figures 9 and 9a, the latter being shown as supported and heated by a substantially cone-shaped filament 37. In similar manner intimately formed mixtures 45 such as already described of the quartz and the oxide may be applied to a filament 14 as shown in Figure 13. The cone-shaped coils 37 and crucible 36 supply supporting means for the quartz during the evaporation of the latter and at the same time serve as a source of heat by radiation and conduction when an electric current is passed through the tungsten or other metal comprising the coils 37. It will be understood that the filament ends or extensions 37a provide means for connection to a suitable source of electrical energy.

Referring now particularly to Figure 10 of the drawings, there is shown suitable apparatus for effecting the thermal evaporation of the oxide coated quartz or of the quartz intimately mixed with the oxide. The apparatus, as shown, comprises a bell jar 40 attached to vacuum pumps (not shown), and containing a tungsten electric coil 14 supported by upright supports 19 carried by the base 15, and brackets 18 adjusted on the upright supports and adapted to receive the ends of coil 14 to support it. It is apparent that the thoria or other crucible 36 and the supporting conical filament 37 as shown in the other figures could be substituted in such apparatus for the electric coil or filament 14 to which it is equivalent in function. As shown in the figure, the base 15 is provided with a supporting member 20 for supporting an article to be coated with quartz such as a mirror, reflector, piece of glass, or other suitable member in upright position within the chamber, the article 21 being located opposite the coil or filament 14. Where a thoria crucible assembly such as is shown is to be employed, the evaporation is upwards and the article to be coated would, therefore, be located above the crucible assembly in any suitable manner.

In order to coat the article with quartz and to evaporate the same, the chamber of the apparatus of Figure 10 is evacuated to a high degree, such as to about 10 to the minus 5 millimeters, by means of suitable pumping apparatus or equipment (not shown) for this purpose. The electric coil or filament 14 is now energized and thus heated, whereupon the oxide coated quartz or intimate mix of oxide and quartz will tend to adhere to the filament as the oxide melts and, in effect, wet or coat the filament 14 due to the formation thereby of a superficial molten condition on the surface of the quartz. The heat from the filament 14, with which the pieces or sticks, as the case may be, of oxide treated quartz are in actual physical contact throughout a portion of their surface area through the medium of the molten coating 11 or 13, is directly communicated to the quartz. Quartz alone is a poor heat conductor.

Figure 5:
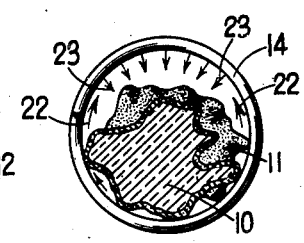
Figure 5 is a vertical sectional view taken substantially along the line 5—5 of Figure 3, looking in the direction of the arrows.
Figure 6:
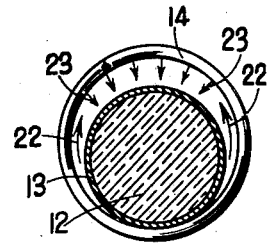
Figure 6 is a vertical sectional view taken substantially along the line 6—6 of Figure 4 looking in the direction of the arrows.

As seen in Figures 5 and 6, the heat waves travel upwardly in molten coatings such as 11 and 13 generally in the direction of the arrows 22 to completely encircle the surface of the quartz and oxide mixture in intimate contact with each other, such as the coated quartz or quartz and oxide mixture. Radiant heat from those portions of the filament 14 with which the treated quartz is not actually in physical contact, travels from the filament generally in the direction of the arrows 23 to the heat radiation absorbing oxide treated quartz or molten coatings 11 or 13 thereon and thence, by surface contact, directly to the quartz 10 or 12. Quartz alone does not absorb radiant heat to any large degree and is hence difficult to heat. With the oxide treated or mixed quartz, however, all portions or surfaces of the coated quartz or quartz mixture with oxide are subjected to the heat, the quartz becoming heated throughout by such radiation absorption and by virtue of this, evaporation can be secured from all quartz surfaces and uniformly in all directions so that both the heating and the evaporation of the quartz are controlled and effectually accomplished. The absorption of heat as radiation secured by the presence of the metallic oxide or metallic oxides if a mixture of such oxides is employed, suffices in itself to get the heat into the quartz to secure evaporation. Superficial fusion when it occurs as is generally the case is further helpful in supplying heat by conduction processes as described above.

The maintenance of a high degree of heat on the heat radiating quartz supporting coil or filament 14, or the similar heat radiating and supporting thoria crucible 36, will now cause the thermal evaporation of the quartz. The molecules or particles thereof will be dispersed and deposited upon the article 21, such as the reflective face of a mirror or reflector located within the apparatus, to produce on said article or reflective surface, a protective hard coating or layer of quartz which is uniform and relatively thick.

In Figure 11 there is shown a finished product or article produced in accordance with the invention. In this figure, the article, for example a mirror or reflector 21, has a backing or base 26, preferably formed from glass, a reflective or mirrored surface or face 27, and a relatively thick and uniform protective surface coating or layer 28 of quartz. It is to be noted particularly that the quartz protective coating or layer 28 is relatitively thick and uniform so as to provide a permanent protective coating or surface for the mirror or reflector to prevent any danger of damaging or marring the mirrored or reflective surface by scratching, or otherwise.

Quartz must be heated to temperatures beyond 1500° C. to obtain evaporation thereof in a high vacuum. It is believed that the mere heating of quartz in a tungsten electric resistance coil, as in most previous attempts to evaporate this material, failed despite high heater wire temperatures, because of the fact that a large or major portion or area of the quartz was not heated to these high temperatures. This would appear to be due to both the poor heat conductivity and the poor radiant heat absorption of the quartz. Heating by convection currents is, of course, absent in a vacuum and the quartz which does not melt, becomes heated only at the immediate point at which it contacts the tungsten wire. This wire may easily be at a temperature above 3300° C. without the main body of the quartz being heated to a sufficiently high temperature, such as 1800° to 2000° C., or more, to evaporate in the vacuum. The localization of the heating with ordinary quartz is shown by a peculiar phenomena in that on close observation the quartz pieces are found not to remain at rest and in contact with the heater wires, but to actually "dance" on the same. Thus, the localized areas in contact with the heater wire are raised sufficiently in temperature to vaporize some quartz and the pressure of such vapor at this spot, which exists only on the heater contacting side of the piece, is sufficient to lift the piece away from the wire. This breaks the thermal contact and the quartz piece immediately cools and stops evaporating and as the vapor pressure disappears, the piece again falls onto the wire. Thus, the only means of getting heat into the clear non-radiant heat absorbing quartz is by the application of a localized thermal contact which is constantly broken. In the case of heating a rod of uncoated quartz, the quartz continuously bounds around inside the coil as it is blown away from contact and on hitting on the other side and making thermal contact, it again bounces back off. It will be understood, therefore, that as thermal conduction is poor in untreated quartz, most of the surface of the quartz (and the inside of the particles) do not get sufficiently hot to become evaporating surfaces and hence there is no uniformity of evaporation in all directions into the apparatus. The evaporation secured is sporadic and undependable, and relatively small in quantity.

In accordance with the method here set out these difficulties have been overcome by getting at least the surfaces of the quartz uniformly and highly heated throughout so that all surfaces of the quartz become evaporation surfaces, by applying to or mixing with the quartz an oxide which absorbs radiant heat, which conducts heat around the particles or through the mixture, and which generally gives a superficial molten phase to the quartz which increases the heating also through better thermal contact, thus permitting the rapid evaporation of relatively large quantities of quartz in a short time and uniformly in all directions.

Figure 7:
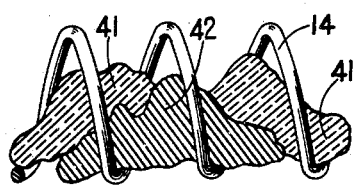
Figure 7 is an elevational view similar to Figure 3 of a portion of an electric coil or filament shown supporting several pieces of uncoated ordinary quartz to be heated in the presence of another piece or pieces, as shown, of a metallic oxide such as for example aluminum oxide.

In Figure 7 there is shown a further modification of the manner in which the invention may be carried out. Thus, if pieces of a stable metallic oxide such as aluminum oxide or lead monoxide are fused in the presence of quartz pieces the molten metallic oxide wets the quartz and thereby coats the same and if further heating is continued in a vacuum, the quartz is then readily and uniformly evaporated. In this figure, pieces of quartz 41 and pieces of a metallic oxide 42 such as for example aluminum oxide or lead oxide are placed adjacent and supported in and by a filament 14 which may, if desired, be supported in a vacuum chamber, such as those shown in Figures 10 and 12. Necessarily larger quantities of metallic oxide are employed when evaporating quartz by this modified form of the invention when the metallic oxide pieces are sizable so as to insure good coverage of the quartz surfaces, while only very small quantities of the metallic oxide are found to be necessary when applied as a uniformly distributed coating or covering on the quartz, as discussed above.

Where a finely powdered mixture of quartz and a metallic oxide such as aluminum oxide or calcium oxide is employed, as shown as a whole at 38 in Figure 9a, very effective action in inducing ready evaporation is also secured by the use of relatively small amounts of the metallic oxide. In Figure 9a there is shown, as mentioned above, a thoria crucible 36 supported by a conical electrically heated filament 37, in which the powdered mixture 38 is placed. This mixture is preferably composed of pieces or particles 41a of quartz and somewhat smaller pieces or particles 42a of the metallic oxide. The use of an intimate finely divided mixture of quartz and metallic oxide as a molded pellet or rod or a prefused pellet or rod 45 as shown in Figure 13 is quite advantageous.

Figure 8:
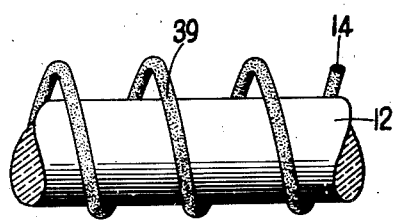
Figure 8 is an elevational view of a portion of an electric coil or filament coated with a fused coating of a metallic oxide and shown supporting a rod or bar of ordinary uncoated quartz.

After having carried out an evaporation from a wire filament of quartz in the presence of a metallic oxide such as aluminum oxide or magnesium oxide, the residual metallic oxide will be found as a fused coating 39 on the filament or coil 14, as shown in Figure 8. Where this is of a fair amount, the subsequent insertion of pieces of uncoated quartz into such filament is found to secure the advantages of this invention since upon heating such a filament within a vacuum chamber, the metallic oxide on the filament melts and then flows over the surface of the quartz and brings about the heating and evaporation of the quartz.

Another method of carrying out the invention is illustrated in Figure 15, in which there is illustrated at 50 a quartz tube closed at one end and having the opposite end closed by a plug 51 which if desired may also be of quartz. Inside the tube 50 is placed a metallic oxide 52 having the property of absorbing radiant heat and capable of transferring absorbed heat to the tube by conduction.

The tube 50 is placed within an evacuated bell or vessel such as shown at 40 in proximity to a source of radiant heat. The quartz is substantially transparent to radiant heat, so that when the source is energized, radiant heat passes through the walls of tube 50, and is absorbed by material 52. This results in raising the temperature of the material, and the transfer of heat therefrom to the tube 50 by conduction. By this means, the temperature of the quartz tube 50 may be raised to a point where thermal evaporation takes place from the outer surface of the tube which is exposed to the vacuum prevailing within the bell 40.

Example 1

By way of a further example illustrating the application of the invention in the forming of a mirror protected by a quartz surface layer four filaments in an apparatus illustrated in Figure 14 were loaded as follows: In filament 14c there was placed 0.75 gram of silver and in filament 14d ordinary quartz rod weighing 0.33 gram was inserted. An article support 20a carrying a piece of cleaned glass 21a was placed to the side of these filaments at a distance of twelve inches. In each of the third and fourth coils, 14e and 14f which were three inches away from the quartz-carrying filament and placed respectively above and below the same, there were placed pieces of aluminum oxide weighing 0.1 gram. The chamber was then closed and evacuated to produce a high vacuum and a shield S was positioned between the filaments 14c and 14d, 14e and 14f. The filament 14c was then energized and the silver evaporated and deposited upon the glass support to form a mirror deposit thereon. Next the filaments 14e and 14f carrying the aluminum oxide were heated by passage of an electric current through the same and after melting, the aluminum oxide was evaporated. Only a small portion of this deposited upon the quartz and the aluminum oxide coating produced on the quartz probably did not exceed .0005 millimeter in thickness. After the quartz was thus coated with aluminum oxide the shield, which has protected the quartz from the silver and the glass from the aluminum oxide, was removed as by being lowered below the filament 14d and the latter was then heated and the quartz evaporated upon the silver-coated glass. This gave a silver first surface mirror in which the silver coating and protective quartz coating thereon were of about equal thicknesses of the order of .0001 millimeter.

Example 2

Small quartz rods ⅛ inch diameter were rolled each separately in powdered calcium oxide, titanium dioxide, ferric oxide, and cobaltous oxide. The four respectively coated rods were then heated briefly in a blow torch to sinter and to fuse the dusty oxide coating to the surfaces of the quartz rods so that they might more readily be handled. The weight increase of the rods was less than ½%. The calcium oxide melts at 2570° C., the titanium dioxide melts at 1640° C., with some decomposition to the lower oxide titanium trioxide which melts at 2130° C., the ferric oxide also partly decomposes to lower oxides ferrous oxide and ferrosferric oxide which melt respectively at about 1420 and 1540° C., and the cobaltous oxide melts at 1935° C. Each rod was then mounted in a tungsten heating coil in a high vacuum and when the quartz so treated was highly heated it evaporated rapidly and uniformly while practically no evaporation was secured with similar untreated quartz rods even when the tungsten coils were heated up to practical melting of the coil which occurs at about 3370° C. With the treated rods it was only necessary to heat the coil filaments to temperatures in the range of 1800 to 2500° C. In the case of the titanium dioxide and ferric oxide treated rods it would appear that part of the coating of metallic oxide which was active in securing the effects was these oxides and also partly the more stable lower oxides into which the heat decomposed these oxides.

*Example 3*

Two powdered mixtures of intimate nature were made up of precipitated silica or powdered quartz and magnesium oxide in one case and of precipitated silica or powdered quartz and lead oxide in the second case. In each case 5% of the metallic oxide was mixed with the silica. These were made into pellets and on heating these in a high vacuum as in Example 2 in a heated refractory metal filament which radiated heat to the quartz containing pellets the quartz was found to very readily evaporate as compared to simple similar pellets of the precipitated silica alone which would not evaporate under comparable heating and vacuum conditions.

*Example 4*

Small quantities of the metallic oxides, cupric oxide, vanadium oxide, lead oxide, and zinc oxide were loaded separately into the inside of small ⅓ inch diameter quartz tubes of the type illustrated in Figure 15. In the case of the zinc oxide loaded tube it was plugged with a quartz rod and heated in a blow torch to prefuse the zinc oxide to the quartz. The other tubes were plugged with quartz rods but not otherwise treated. On placing these tubes separately in a refractory heating coil such as a tungsten coil in a high vacuum and applying heat to the coil the latter quickly heated the quartz by heat radiation absorption by the metallic oxides in the tubes and rapid uniform evaporation of the quartz was easily attained.

*Example 5*

In two similar quartz tubes small amounts of ammonium vanadate and calcium carbonate were respectively loaded. These tubes were then heated in an oven to decompose the compounds respectively to vanadium oxide and calcium oxide. The tubes were then plugged with quartz rods and separately mounted in coils in high vacuum chambers. Ready evaporation of the quartz was secured when the coils were heated and radiated heat to the quartz tubes thus treated while similar untreated quartz tubes would not evaporate under the same conditions of temperature of filaments and degree of high vacuum.

It is obvious that by the new methods of evaporating quartz thus above described there can readily be deposited quartz in any desired thickness upon a support surface of glass, plastic, or other material to produce a desired article of manufacture. For example, low reflection articles involving a quartz deposit may thus be produced as well as mirrors having a deposit of quartz forming a protective layer.

What I claim as my invention is:

1. The method of coating a surface of an article with quartz by evaporation technique within a vacuum, comprising heating quartz in intimate contact with a heat stable solid metallic oxide on a heat radiating support body in a high vacuum to heat the quartz to a high temperature and to evaporate the quartz, and depositing the quartz on a surface of the article.

2. The method of coating a surface of an article with quartz by evaporation technique within a vacuum, comprising heating quartz in contact with a metallic compound giving a heat stable metallic oxide when heated in thermal contact with a heat radiating support body in a high vacuum to heat and decompose the metallic compound to a heat stable metallic oxide, continuing the application of heat to heat the quartz to a high temperature and to evaporate the quartz, and depositing the quartz on a surface of the article.

3. The method of coating a reflective mirror surface with quartz by evaporation technique within a vacuum, comprising heating quartz in intimate contact with a heat stable solid metallic oxide within a heat radiating support body in a high vacuum to heat the quartz to a high temperature and to evaporate the quartz, and depositing the quartz on a reflective mirror surface.

4. The method of coating a surface of an article with quartz by evaporation technique within a vacuum, comprising contacting a substantial part of the surface of the quartz with a heat stable solid metallic oxide and heating the quartz and attached metallic oxide within a heat radiating support body in a high vacuum to heat the quartz and metallic oxide to a high temperature and to evaporate the quartz, and depositing the quartz on a surface of the article.

5. A method according to claim 1, wherein the temperature is raised above 1500° C.

6. The method of coating a surface of an article with quartz by evaporation technique within a vacuum, comprising positioning the quartz within an unheated refractory filament located within a vacuum, thermally evaporating a heat stable metallic oxide in the vacuum and depositing metallic oxide upon the quartz, electrically heating the refractory filament supporting the quartz to radiate heat to the metallic oxide on the quartz to heat said quartz to a high temperature and to evaporate the quartz, and depositing the quartz on a surface of the article.

7. The method of coating a surface of an article with quartz by evaporation technique within a vacuum, comprising chemically forming a heat stable metallic oxide in intimate contact with a substantial part of the surface of the quartz, positioning the quartz and attached metallic oxide within a heat radiating support body in a high vacuum to heat the quartz to a high temperature and to evaporate said quartz, and depositing the quartz on a surface of the article.

8. The method of coating a surface of an article with quartz by evaporation technique within a vacuum, comprising positioning quartz and a heat stable solid metallic oxide within a heat radiating support body in a high vacuum, fusing the metallic oxide and coating the surface of the quartz with the metallic oxide, further heating the quartz and coating thereon to heat the quartz to a high temperature and to evaporate the quartz, and depositing the quartz on a surface of the article.

9. The method of coating a surface of an article with quartz by evaporation technique within a vacuum, comprising contacting a substantial part of the surface of the quartz with aluminum oxide heating the quartz and attached aluminum oxide within a heat radiating support body in a high vacuum to heat the quartz to a high temperature and to evaporate the quartz, and depositing the quartz on a surface of the article.

10. The method of coating a surface of an article with quartz by evaporation technique within a vacuum, comprising contacting a substantial part of the surface of the quartz with calcium oxide heating the quartz and attached calcium oxide within a heat radiating support body in a high vacuum to heat the quartz to a high temperature and to evaporate the quartz, and depositing the quartz on a surface of the article.

11. The method of coating a surface of an article with quartz by evaporation technique within a vacuum, comprising contacting a substantial part of the surface of the quartz with a heat stable titanium oxide heating the quartz and attached oxide of titanium within a heat radiating support body in a high vacuum to heat the quartz to a high temperature and to evaporate the quartz, and depositing the quartz on a surface of the article.

WILLARD L. MORGAN.

No references cited.